US010995832B2

United States Patent
Shimizu

(10) Patent No.: US 10,995,832 B2
(45) Date of Patent: May 4, 2021

(54) ELECTRIC ACTUATOR

(71) Applicant: NTN CORPORATION, Osaka (JP)

(72) Inventor: Tatsunori Shimizu, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/342,619

(22) PCT Filed: Oct. 24, 2017

(86) PCT No.: PCT/JP2017/038320
§ 371 (c)(1),
(2) Date: Apr. 17, 2019

(87) PCT Pub. No.: WO2018/079535
PCT Pub. Date: May 3, 2018

(65) Prior Publication Data
US 2019/0264789 A1    Aug. 29, 2019

(30) Foreign Application Priority Data
Oct. 31, 2016 (JP) .............................. JP2016-213125

(51) Int. Cl.
*F16H 25/24* (2006.01)
*H02K 7/06* (2006.01)
(Continued)

(52) U.S. Cl.
CPC ............. *F16H 25/24* (2013.01); *F16C 19/18* (2013.01); *F16H 25/2204* (2013.01);
(Continued)

(58) Field of Classification Search
CPC ............. F16H 25/24; F16H 2025/2062; F16H 2025/2081; F16H 25/2204;
(Continued)

(56) References Cited

U.S. PATENT DOCUMENTS 6,702,060 B2 * 3/2004 Tatewaki ............. B62D 5/0424
180/444
6,810,985 B1    11/2004 Budaker et al.
(Continued)

FOREIGN PATENT DOCUMENTS

EP          1 158 208       11/2001
JP          6-327190        11/1994
(Continued)

OTHER PUBLICATIONS

International Preliminary Report on Patentability and Written Opinion of the International Searching Authority dated Apr. 30, 2019 in International (PCT) Application No. PCT/JP2017/038320.
(Continued)

*Primary Examiner* — Bobby Rushing, Jr.
(74) *Attorney, Agent, or Firm* — Wenderoth, Lind & Ponack, L.L.P.

(57) ABSTRACT

Provided is an electric actuator, comprising: a driving motor (2); a motion conversion mechanism (6) configured to convert a rotary motion of the driving motor (2) to a linear motion in an axial direction parallel with an output shaft (2a) of the driving motor (2); and a transmission gear mechanism (5) configured to transmit a driving force from the driving motor (2) to the motion conversion mechanism (6), wherein a double-row bearing (24) configured to support the motion conversion mechanism (6) is arranged on an opposite side of the driving motor (2) with respect to the transmission gear mechanism (5), and wherein a relationship of $L < Dm/2 + Db/2$ is satisfied, where Dm is an outer diameter of the driving motor (2), Db is an outer diameter of the double-row bearing (24), and L is an axis-to-axis distance (L) between the driving motor (2) and the motion conversion mechanism (6).

3 Claims, 8 Drawing Sheets

(51) Int. Cl.
*F16C 19/18* (2006.01)
*F16H 25/22* (2006.01)
*H02K 7/116* (2006.01)
*F16H 37/12* (2006.01)
*F16H 25/20* (2006.01)

(52) U.S. Cl.
CPC ............... *F16H 37/12* (2013.01); *H02K 7/06* (2013.01); *H02K 7/116* (2013.01); *F16H 2025/2081* (2013.01); *F16H 2025/2087* (2013.01); *H02K 2213/03* (2013.01)

(58) Field of Classification Search
CPC ........ F16H 2025/2087; H02K 2213/03; B62D 5/0424; B62D 5/0448
See application file for complete search history.

(56) References Cited

U.S. PATENT DOCUMENTS

| | | | |
|---|---|---|---|
| 7,665,378 B2* | 2/2010 | Nakamura | B62D 5/0403 |
| | | | 74/388 PS |
| 8,141,445 B2* | 3/2012 | Yoshioka | F16C 35/063 |
| | | | 29/505 |
| 8,511,419 B2* | 8/2013 | Bando | B62D 5/0448 |
| | | | 180/443 |
| 9,440,673 B2* | 9/2016 | Nakamura | B62D 5/0448 |
| 2001/0045783 A1 | 11/2001 | Hagiike | |
| 2008/0006471 A1 | 1/2008 | Nakamura et al. | |
| 2008/0092679 A1 | 4/2008 | Tateishi et al. | |
| 2010/0319477 A1 | 12/2010 | Tateishi et al. | |
| 2014/0345966 A1* | 11/2014 | Asakura | F16C 25/083 |
| | | | 180/444 |
| 2017/0050669 A1* | 2/2017 | Asakura | B62D 5/0481 |
| 2017/0145727 A1* | 5/2017 | Yamagata | E05F 15/622 |
| 2017/0248210 A1* | 8/2017 | Muller | F16H 25/24 |
| 2017/0275939 A1* | 9/2017 | Tsukagoshi | E05F 15/622 |
| 2017/0349205 A1* | 12/2017 | Kaneko | B62D 5/0448 |

FOREIGN PATENT DOCUMENTS

| | | | |
|---|---|---|---|
| JP | 2000-120810 | 4/2000 | |
| JP | 2003-516906 | 5/2003 | |
| JP | 2004-114972 | 4/2004 | |
| JP | 2008-6869 | 1/2008 | |
| JP | 2008-116037 | 5/2008 | |
| JP | 2008-175326 | 7/2008 | |
| JP | 2010-035263 | 2/2010 | |
| JP | 5243018 | 7/2013 | |
| JP | 2014-227048 | 12/2014 | |
| WO | WO-2017153964 A1 * | 9/2017 | .............. B60T 1/067 |

OTHER PUBLICATIONS

International Search Report dated Jan. 16, 2018 in International (PCT) Application No. PCT/JP2017/038320.
Extended European Search Report dated May 4, 2020 in corresponding European Patent Application No. 17864985.1.
Chinese Office Action dated Aug. 12, 2020 in counterpart Chinese patent application No. 201780067670.7 with English translation of Search Report.
Notice of Reasons for Refusal dated Oct. 30, 2020 in counterpart Japanese Patent Application No. 2016-213125 with English translation.

* cited by examiner

ELECTRIC ACTUATOR

TECHNICAL FIELD

The present invention relates to an electric actuator.

BACKGROUND ART

In recent years, electrification of automobiles and the like has been promoted for power saving and reduction in fuel consumption. For example, a system for operating an automatic transmission, a brake, a steering wheel, and the like of the automobile with use of power of an electric motor has been developed and brought to the market. As an electric actuator for use in such an application, there has been known an electric linear actuator employing a ball screw mechanism configured to convert a rotary motion of a motor into a motion in a linear direction.

For example, as illustrated in FIG. 8, in Patent Literature 1, there is disclosed an electric linear actuator mainly including an electric motor 100, a ball screw 200, and a gear speed reduction mechanism 500. The gear speed reduction mechanism 500 is configured to transmit a rotary motion of the electric motor 100 to the ball screw 200. The ball screw 200 includes a screw shaft 201, a nut 202, and a large number of balls 203. The screw shaft 201 has a spiral screw groove formed in an outer peripheral surface. The nut 202 is externally fitted to the screw shaft 201, and has a spiral screw groove formed in an inner peripheral surface. The balls 203 are received in both of the screw grooves. The gear speed reduction mechanism 500 includes a first gear 501 and a second gear 502. The first gear 501 has a small diameter, and is fixed to a motor shaft 100a of the electric motor 100. The second gear 502 has a large diameter, is formed on an outer periphery of the nut 202, and meshes with the first gear 501. When a driving force of the electric motor 100 is transmitted to the nut 202 thorough intermediation of the gears 501 and 502, the nut 202 rotates, and the screw shaft 201 performs a linear motion.

CITATION LIST

Patent Literature 1: JP 5243018 B2

SUMMARY OF INVENTION

Technical Problem

Incidentally, in the electric linear actuator disclosed in Patent Literature 1, in order to support the nut 202, two rolling bearings 600 and 700 are arranged on both sides of the nut 202 while sandwiching the second gear 502. However, in the case in which the rolling bearings 600 and 700 are arranged at such positions, when other component parts are to be arranged around the ball screw 200, such a restriction in terms of layout that interference with the respective rolling bearing 600 and 700 needs to be prevented on the both sides of the second gear 502 is imposed, which may pose a problem in downsizing.

The present invention has been made in view of the above-mentioned problem, and therefore has an object to provide an electric actuator capable of achieving downsizing.

Solution to Problem

As a technical measure to attain the above-mentioned object, according to one embodiment of the present invention, there is provided an electric actuator, comprising: a driving motor; a motion conversion mechanism configured to convert a rotary motion of the driving motor to a linear motion in an axial direction parallel with an output shaft of the driving motor; and a transmission gear mechanism configured to transmit a driving force from the driving motor to the motion conversion mechanism, wherein a double-row bearing configured to support the motion conversion mechanism is arranged on an opposite side of the driving motor with respect to the transmission gear mechanism, and wherein a relationship of $L1 < Dm/2 + Db/2$ is satisfied, where Dm is an outer diameter of the driving motor, Db is an outer diameter of the double-row bearing, and L1 is an axis-to-axis distance between the driving motor and the motion conversion mechanism.

In such a manner, the motion conversion mechanism can be stably supported in a cantilever state through use of the double-row bearing as the support bearing configured to support the motion conversion mechanism. That is, there can be provided such a configuration that the double-row bearing is arranged only on the opposite side of the driving motor with respect to the transmission gear mechanism, and any bearing configured to support the motion conversion mechanism is not arranged on a driving motor side. As a result, it is not require that interference between the driving motor and a bearing be considered on the driving motor side, and the driving motor can be arranged close to the motion conversion mechanism in a radial direction orthogonal to the axial direction. Specifically, the driving motor and the motion conversion mechanism can be arranged so close to each other that the relationship of $L1 < Dm/2 + Db/2$ is satisfied, where Dm is the outer diameter of the driving motor, Db is the outer diameter of the double-row bearing, and L1 is the axis-to-axis distance between the driving motor and the motion conversion mechanism. As a result, the axis-to-axis distance between the driving motor and the motion conversion mechanism can be reduced, and downsizing of the electric actuator in the radial direction can thus be achieved.

Moreover, in such a configuration that the electric actuator comprises a speed reduction mechanism configured to reduce the speed of the rotary motion of the driving motor and then output the rotary motion reduced in speed to the transmission gear mechanism, when the speed reduction mechanism is provided between the driving motor and the transmission gear mechanism, the speed reduction mechanism can be arranged at a position that does not interfere with the double-row bearing. As a result, the speed reduction mechanism can be arranged close to the motion conversion mechanism in the radial direction orthogonal to the axial direction, and downsizing of the electric actuator in the radial direction can thus be achieved. Specifically, there can be provided a configuration in which a relationship of $L2 < Dr/2 + Db/2$ is satisfied, where Dr is an outer diameter of the speed reduction mechanism, Db is the outer diameter of the double-row bearing, and L2 is an axis-to-axis distance between the speed reduction mechanism and the motion conversion mechanism. Moreover, in the case of the configuration comprising the speed reduction mechanism, a small-sized motor can be employed, and further downsizing of the electric actuator can thus be achieved.

Further, the downsizing of the electric actuator is further promoted through employment of a planetary-gear speed reduction mechanism as the speed reduction mechanism.

Moreover, the motion conversion mechanism can stably and reliably be supported in the cantilever state against loads in various directions through employment of a double-row angular contact ball bearing as the double-row bearing. A reduction in operation efficiency and increases in noise and vibration due to an occurrence of a run out in a shaft of the motion conversion mechanism can thus be prevented.

Advantageous Effects of Invention

According to the present invention, the axis-to-axis distance between the driving motor and the motion conversion mechanism can be reduced, and downsizing of the electric actuator in the radial direction can thus be achieved.

DESCRIPTION OF EMBODIMENTS

Now, description is made of the present invention with reference to the accompanying drawings. In the respective drawings for illustrating the present invention, components such as members and component parts having the same functions or shapes are denoted by the same reference symbols as long as the components can be distinguished, and description thereof is therefore omitted after the description is made once.

Figure 1:
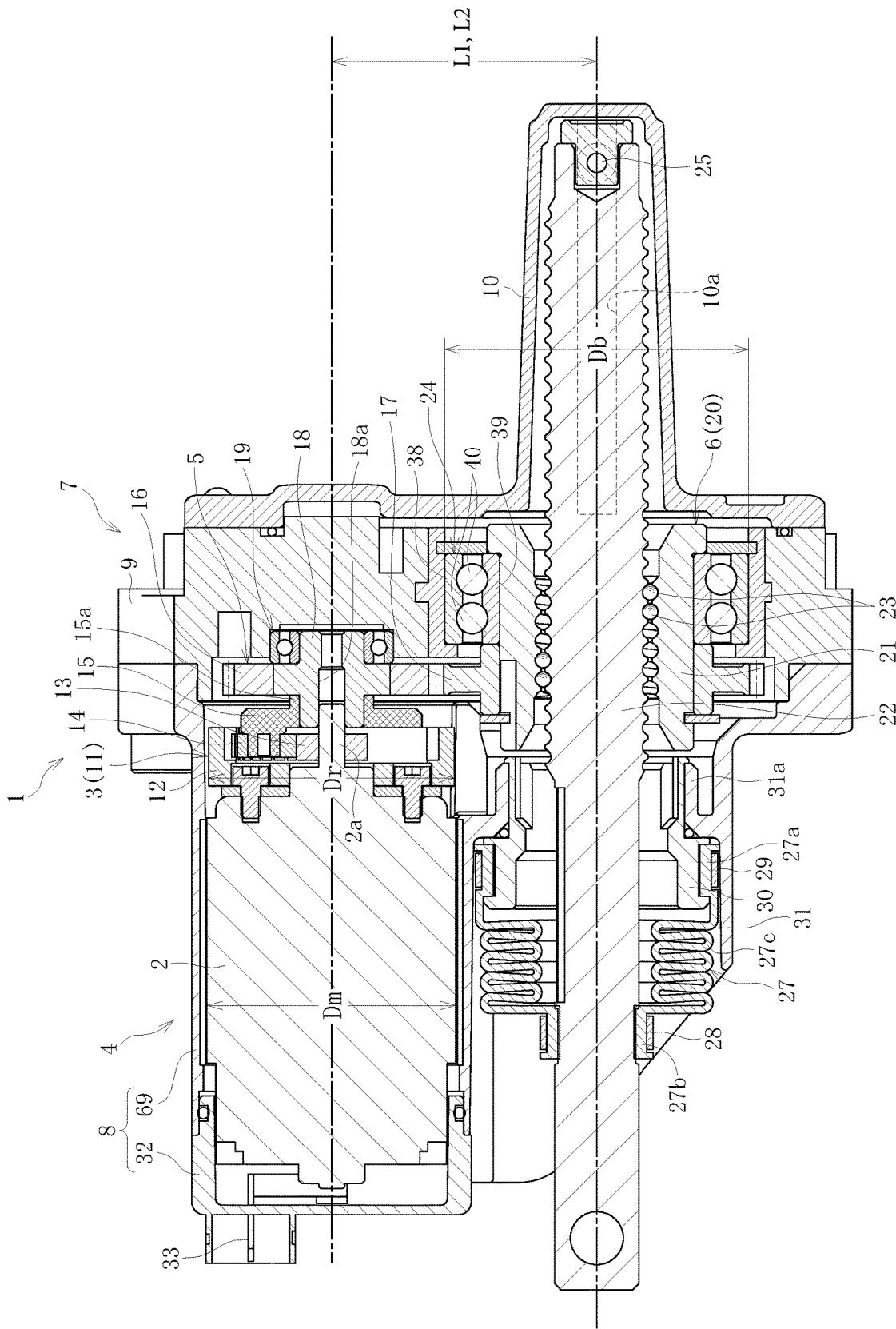
FIG. 1 is a vertical sectional view of an electric actuator according to one embodiment of the present invention.
Figure 2:
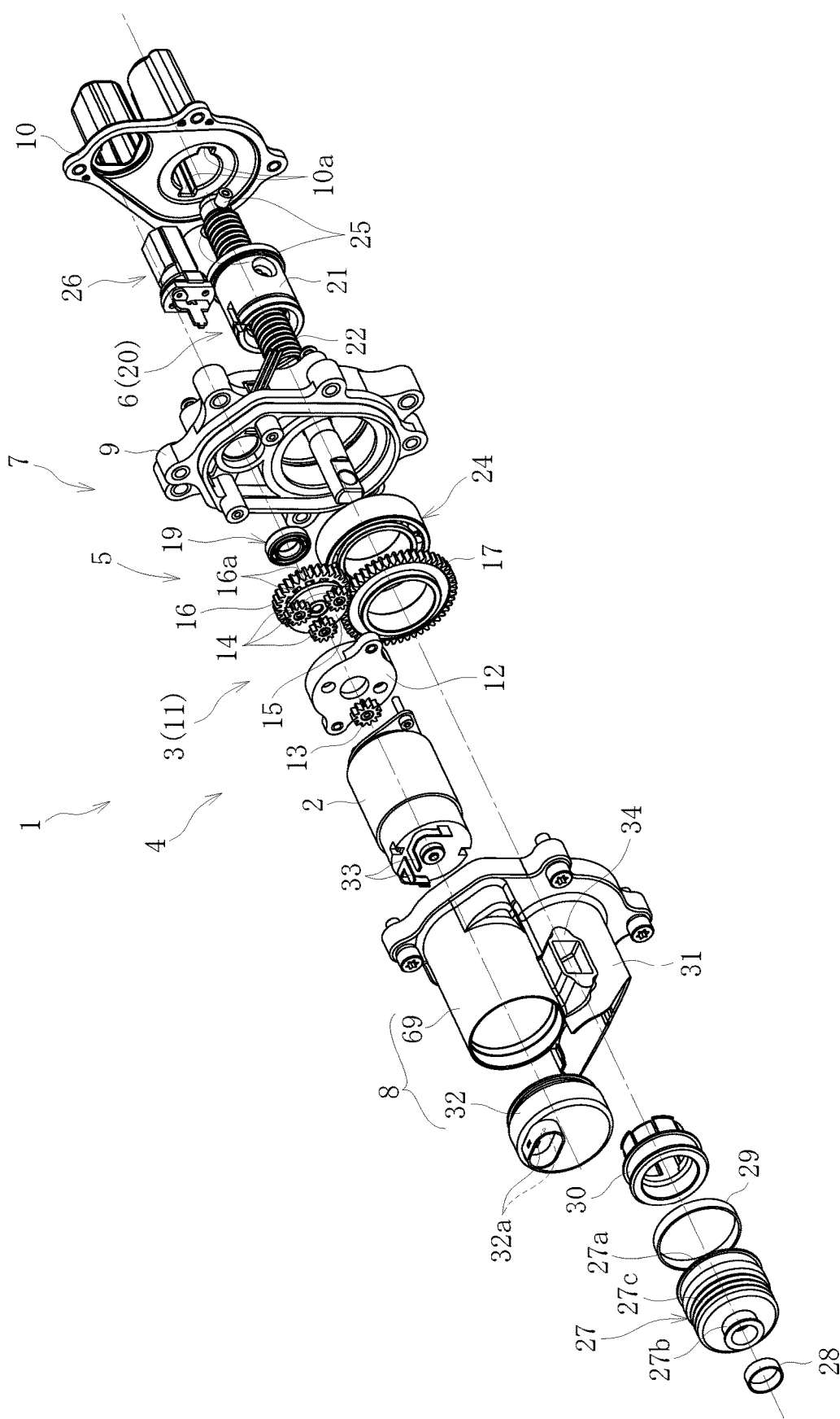
FIG. 2 is an exploded perspective view of the electric actuator.

FIG. 1 is a vertical sectional view of an electric actuator according to one embodiment of the present invention. FIG. 2 is an exploded perspective view of the electric actuator.

As illustrated in FIG. 1 and FIG. 2, the electric actuator 1 according to this embodiment mainly comprises a motor section 4 and a drive transmission/conversion section 7. The motor section 4 comprises a driving motor 2 and a speed reduction mechanism 3. The drive transmission/conversion section 7 comprises a transmission gear mechanism 5 and a motion conversion mechanism 6. As described later, it is not always required that the motor section 4 comprise the speed reduction mechanism 3.

The sections forming the electric actuator 1 comprise respective exterior cases. Components are accommodated or supported in the respective exterior cases. Specifically, the motor section 4 comprises a motor case 8 configured to accommodate the driving motor 2 and the speed reduction mechanism 3. The drive transmission/conversion section 7 comprises an actuator case 9 configured to support the transmission gear mechanism 5 and the motion conversion mechanism 6. Moreover, the motor case 8 comprises a motor-case main body 69 and a cap member 32. The motor-case main body 69 is configured to accommodate the driving motor 2. The cap member 32 is formed independently of the motor-case main body 69. The motor-case main body 69 is mounted to the actuator case 9 so as to be coupled and decoupled in an axial direction of the driving motor 2. The driving motor 2 and the speed reduction mechanism 3 are also mounted to the actuator case 9 so as to be coupled and decoupled in the axial direction. Further, a shaft case 10 configured to accommodate apart of the motion conversion mechanism 6 is mounted to the actuator case 9 on an opposite side of a motor case 8 side so as to be coupled and decoupled in the axial direction. These exterior cases are assembled to one another through fastening with bolts. Now, description is made of detailed configurations of the respective parts forming the electric actuator 1.

Figure 3:
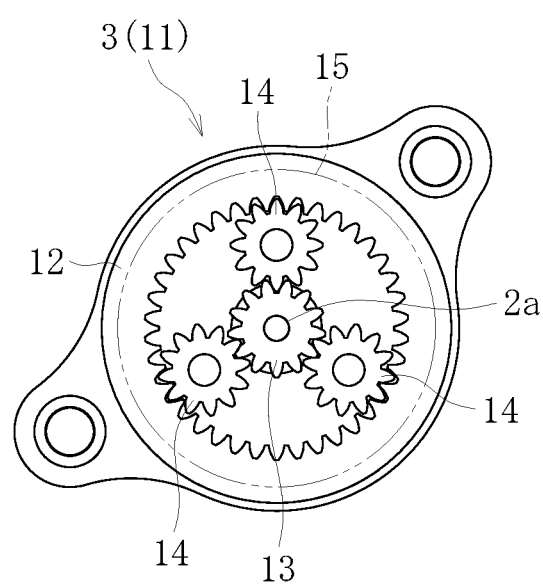
FIG. 3 is a view of a planetary-gear speed reduction mechanism as seen in an axial direction.

FIG. 3 is a view of the speed reduction mechanism as seen in the axial direction.

The speed reduction mechanism 3 comprises a planetary-gear speed reduction mechanism 11 formed of a plurality of gears and the like. As illustrated in FIG. 3, the planetary-gear speed reduction mechanism 11 is formed of a ring gear 12, a sun gear 13, a plurality of planetary gears 14, and a planetary gear carrier 15.

The sun gear 13 is arranged at the center of the ring gear 12. An output shaft 2a of the driving motor 2 is press-fitted to the sun gear 13. Moreover, the respective planetary gears 14 are arranged between the ring gear 12 and the sun gear 13 so as to mesh with the ring gear 12 and the sun gear 13. The respective planetary gears 14 are rotatably held by the planetary gear carrier 15.

In the planetary-gear speed reduction mechanism 11, when the driving motor 2 performs the rotational drive, the sun gear 13 coupled to the output shaft 2a of the driving motor 2 rotates, and, along with this rotation, the respective planetary gears 14 revolve along the ring gear 12 while rotating. Then, the planetary gear carrier 15 is rotated by the revolution motion of the planetary gears 14. With this, the speed of the rotation of the driving motor 2 is reduced, the rotation reduced in speed is transmitted, and a rotation torque increases. Through the transmission of the driving force via the planetary-gear speed reduction mechanism 11 in such a manner, a high output of the electric actuator 1 is thus obtained, and downsizing of the driving motor 2 can thus be achieved. In this embodiment, although an inexpensive (brush) DC motor is used as the driving motor 2, other motor such as a brushless motor may be used.

Next, as illustrated in FIG. 1 and FIG. 2, the transmission gear mechanism 5 is formed of a drive gear 16 and a driven gear 17. The drive gear 16 has a small diameter, and serves as a first gear with a rotation shaft arranged coaxially with the output shaft 2a of the driving motor 2. The driven gear 17 has a large diameter, and serves as a second gear which meshes with the drive gear 16. A gear boss 18 (see FIG. 1) serving as a rotation shaft is press-fitted to a rotation center portion of the drive gear 16. One end portion (right end portion in FIG. 1) of the gear boss 18 is rotatably supported by a rolling bearing 19 mounted to the actuator case 9. The drive gear 16 and the gear boss 18 may be integrally formed through sintering. Meanwhile, an end portion (left end portion in FIG. 1) of the gear boss on an opposite side is supported through insertion of the output shaft 2a of the driving motor 2 into a shaft hole 18a opened on a side of this end portion. That is, the output shaft 2a of the driving motor 2 is inserted into the gear boss 18 so as to constitute a relationship of a slide bearing rotatable relatively to the gear boss 18.

The gear boss 18 is so coupled to the planetary gear carrier 15 as to integrally rotate. In detail, the planetary gear carrier 15 has a cylindrical portion 15a (see FIG. 1) at a center portion thereof, and the cylindrical portion 15a is press-fitted over an outer peripheral surface of the gear boss 18. The planetary gear carrier 15 may be made of resin, and the gear boss 18 may be molded integrally with the planetary gear carrier 15 by insert molding. As a result, when the driving motor 2 performs rotary drive, and the planetary gear carrier 15 rotates accordingly, the drive gear 16 rotates integrally with the planetary gear carrier 15, and the driven gear 17 thus rotates. This embodiment is so configured that the rotation is reduced in speed (increased in torque) from the drive gear 16 having a small diameter to the driven gear 17 having a large diameter, but the rotation may be transmitted at a constant speed from the drive gear 16 to the driven gear 17.

Now, description is made of the motion conversion mechanism.

The motion conversion mechanism 6 is formed of a ball screw 20 arranged on an axis parallel with the output shaft 2a of the driving motor 2. The motion conversion mechanism 6 is not limited to the ball screw 20, and may be a lead screw device. However, in terms of reducing the rotation torque and downsizing the driving motor 2, the ball screw 20 is more preferred.

The ball screw 20 comprises a ball screw nut 21, a ball screw shaft 22, a large number of balls 23, and a circulation member (not shown). Spiral grooves are formed in each of an inner peripheral surface of the ball screw nut 21 and an outer peripheral surface of the ball screw shaft 22. Two rows of the balls 23 are received between both of the spiral grooves.

The ball screw nut 21 is rotatably supported by the double-row bearing 24 mounted to the actuator case 9. The double-row bearing 24 is fixed through press-fit on a rear end side (right side of FIG. 1) of the ball screw shaft 22 with respect to a portion on the outer peripheral surface of the ball screw nut 21 to which the driven gear 17 is fixed. Meanwhile, a rotation of the ball screw shaft 22 is restricted through insertion of a pin 25 serving as a rotation restriction member provided on a rear end portion (right end portion in FIG. 1) of the ball screw shaft 22 into guide grooves 10a in an axial direction formed in an inner peripheral surface of the shaft case 10.

When the ball screw nut 21 rotates, the plurality of balls 23 accordingly circulate through the circulation member while moving along the spiral grooves, and the ball screw shaft 22 advances/retreats along the guide grooves 10a of the shaft case 10. The rotary motion from the driving motor 2 is converted to a linear motion in the axial direction parallel with the output shaft 2a of the driving motor 2 through the advance/retreat of the ball screw shaft 22 in such a manner. A distal end portion (left end portion in FIG. 1) of the ball screw shaft 22 in the advance direction functions as an operation part (actuator head) configured to operate a device of an object to be operated. FIG. 1 is a view for illustrating a state in which the ball screw shaft 22 is arranged at an initial position when the ball screw shaft 22 retreats most toward the right side in FIG. 1.

Moreover, the electric actuator 1 according to this embodiment comprises a lock mechanism 26 (see FIG. 2) configured to prevent an unintended advance/retreat of the ball screw shaft 22. The lock mechanism 26 is mounted to the shaft case 10, and is configured to be capable of engaging with/disengaging from a plurality of engagement holes 16a (see FIG. 2) formed over the drive gear 16 in a circumferential direction. Even when an external force is input from a side of the object to be operated to a side of the ball screw shaft 22, an unintended advance/retreat of the ball screw shaft 22 is prevented, and a position of the ball screw shaft 22 in an advance/retreat direction can be maintained at a predetermined position by the lock mechanism 26 engaging with one of the engagement holes 16a, to thereby restrict the rotation of the drive gear 16. The configuration comprising such a lock mechanism 26 is particularly preferred for a case in which the electric actuator is applied to an application that requires maintenance of a position.

A boot 27 configured to prevent entry of foreign substances into the ball screw nut 21 is mounted on a distal end portion side of the ball screw shaft 22. The boot 27 is formed of a large-diameter end portion 27a, a small-diameter end portion 27b, and a bellows 27c. The bellows 27c is configured to connect the large-diameter end portion 27a and the small-diameter end portion 27b to each other, and extend/contract in the axial direction. The small-diameter end portion 27b is fixed to an outer peripheral surface of the ball screw shaft 22 through tightening a boot band 28. The large-diameter end portion 27a of the boot 27 is fixed to an outer peripheral surface of a boot mounting member 30 having a cylindrical shape mounted to the motor-case main body 69 through tightening a boot band 29.

Moreover, a boot cover 31 having a cylindrical shape configured to protect the boot 27 is provided on an outer side of the boot 27. A cylindrical mounting part 31a (see FIG. 1) is provided on an inner side of the boot cover 31. The boot mounting member 30 is mounted to the mounting part 31a. Both the boot cover 31 and the mounting part 31a are provided integrally with the motor-case main body 69.

Moreover, the cap member 32 is mounted to the motor-case main body 69 on an opposite side of an actuator case 9 side. An insertion hole 32a (see FIG. 2) configured to insert a bus bar 33 configured to supply power from a power source (not shown) to the driving motor 2 is formed in the cap member 32. Further, a sensor case 34 (see FIG. 2) configured to accommodate a stroke sensor configured to detect a stroke of the ball screw shaft 22 is provided integrally on the outer peripheral surface of the motor-case main body 69.

Figure 4:
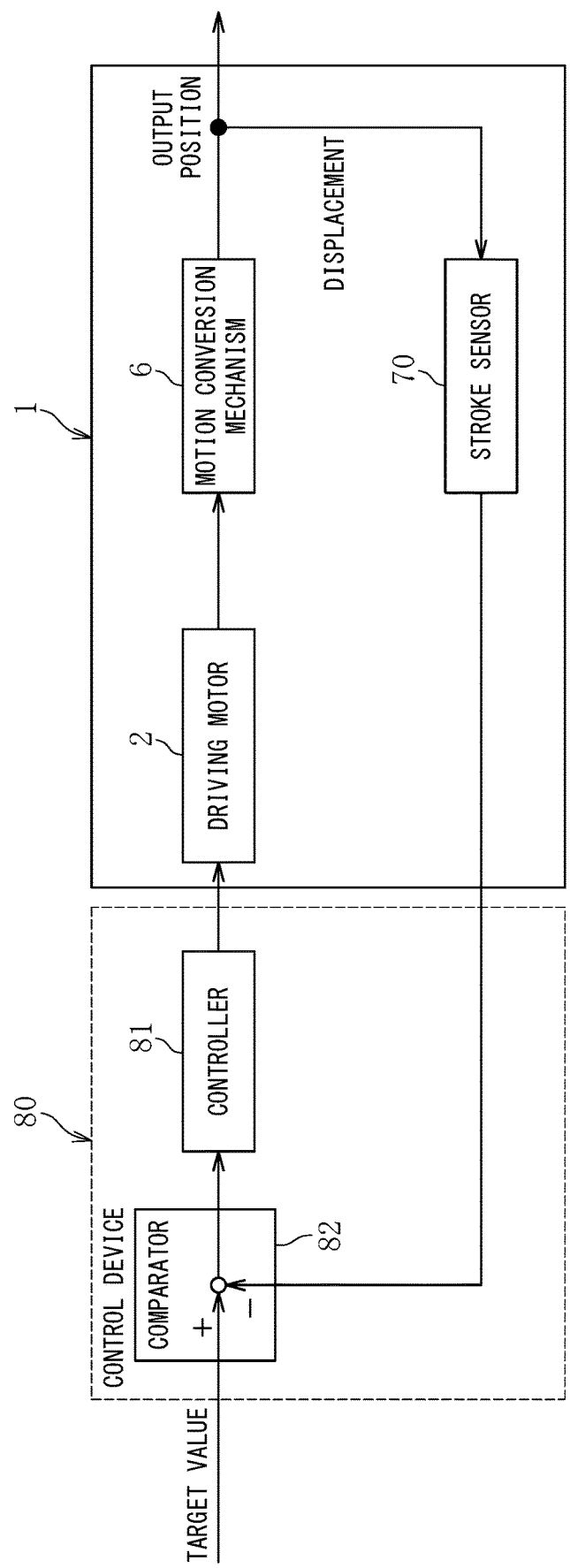
FIG. 4 is a control block diagram of the electric actuator.

Next, with reference to FIG. 4, description is made of feedback control for the electric actuator using the stroke sensor.

As illustrated in FIG. 4, when a target value is transmitted to a control device 80, a control signal is transmitted from a controller 81 of the control device 80 to the driving motor 2. The target value is, for example, a stroke value calculated by an ECU provided at an upper position of a vehicle based on an operation amount when the operation amount is input to the ECU.

When the driving motor 2 receives the control signal, the driving motor 2 starts the rotational drive, and the driving force thereof is transmitted to the ball screw shaft 22 through intermediation of the planetary-gear speed reduction mechanism 11, the drive gear 16, the driven gear 17, and the ball screw nut 21, and the ball screw shaft 22 thus advances. With this, the object device to be operated arranged on the distal end portion side (actuator head side) of the ball screw shaft 22 is operated.

At this time, the stroke value (position in the axial direction) of the ball screw shaft 22 is detected by the stroke sensor 70. The detection value detected by the stroke sensor 70 is transmitted to a comparison portion 82 of the control device 80, and a difference between the detection value and the target value is calculated. Then, the driving motor 2 is driven until the detection value matches the target value. When the electric actuator 1 of this embodiment is applied to, for example, a shift-by-wire system, a shift position can reliably be controlled by feeding back the stroke value detected by the stroke sensor 70 to control the position of the ball screw shaft 22 in such a manner.

Figure 5:
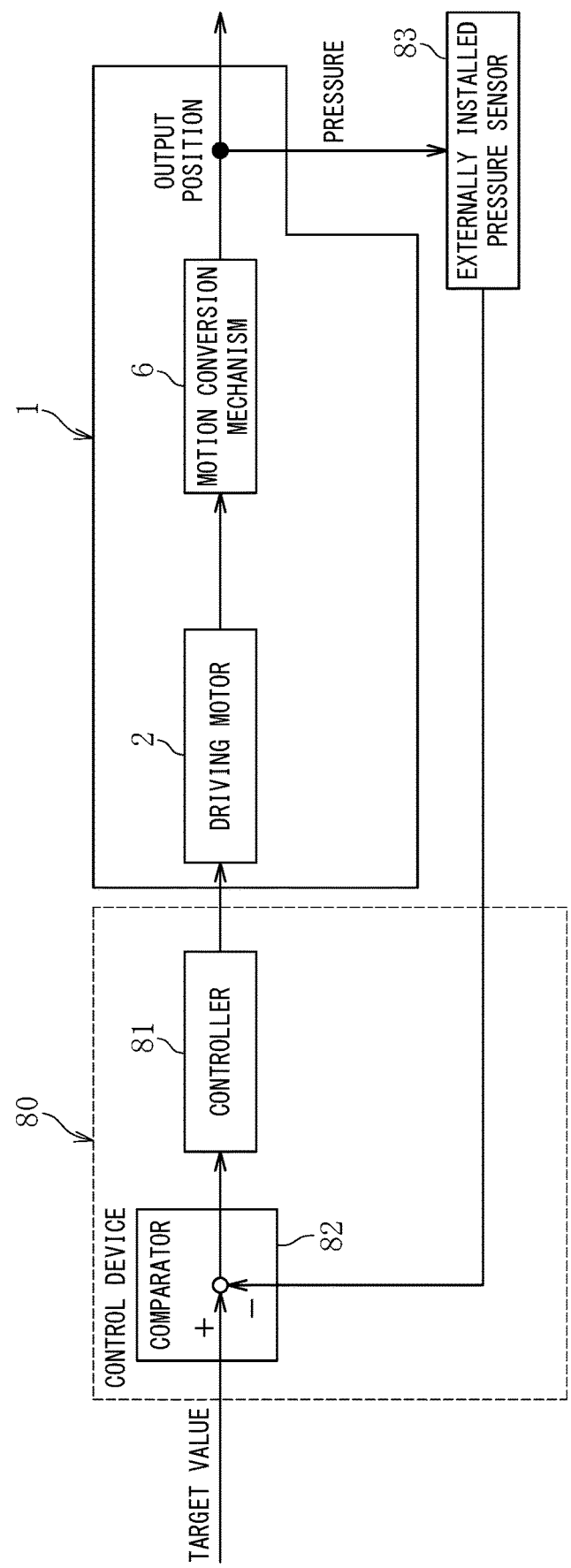
FIG. 5 is a control block diagram of the electric actuator.

Next, with reference to FIG. 5, description is made of feedback control in a case in which a pressure sensor 83 is used in place of the stroke sensor 70.

As illustrated in FIG. 5, in this case, the pressure sensor 83 is provided for the object device to be operated. When the operation amount is input to the ECU provided at the upper position of the vehicle, the ECU calculates a required target value (pressure command value). When the target value is transmitted to the control device 80, and the control signal is transmitted from the controller 81 to the driving motor 2, the driving motor 2 starts the rotational drive. With this, the ball screw shaft 22 advances, and the object device to be operated arranged on the distal end portion side (actuator head side) of the ball screw shaft 22 is operated to pressurize.

An operation pressure of the ball screw shaft 22 at this time is detected by the pressure sensor 83, and the position of the ball screw shaft 22 is subjected to the feedback control based on the detection value and the target value as in the case of the use of the stroke sensor 70. When the electric actuator 1 of this embodiment is applied to, for example, a brake-by-wire system, a hydraulic pressure of a brake can reliably be controlled by feeding back the pressure value detected by the pressure sensor 83 to control the position of the ball screw shaft 22 in such a manner.

The overall configuration and the operation of the electric actuator 1 according to this embodiment are as described above. Now, description is made of components suitable for downsizing relating to the electric actuator 1 of this embodiment.

As illustrated in FIG. 1, the double-row bearing 24 is used as a support bearing configured to support the ball screw 20 in the electric actuator 1 according to this embodiment. As a result, the ball screw 20 can be stably supported in a cantilever state, and there can be provided such a configuration that the double-row bearing 24 is arranged only on one side (right side) with respect to the driven gear 17, and any bearing configured to support the ball screw 20 is not arranged on an opposite side (left side). Need for consideration of interference between a support bearing and other components on the side on which the support bearing is eliminated by arranging the support bearing configured to support the ball screw 20 only on the one side with respect to the driven gear 17, and downsizing can thus be achieved.

Specifically, in this embodiment, interference between the driving motor 2 and the double-row bearing 24 is avoided by arranging the double-row bearing 24 on the opposite side of the driving motor 2 with respect to the driven gear 17. As a result, the driving motor 2 can be arranged close to the ball screw 20 in a radial direction orthogonal to the axial direction by an amount saved by removing the double-row bearing 24 on a driving motor 2 side. That is, the driving motor 2 can be arranged so that the driving motor 2 and the double-raw bearing 24 overlap each other in the radial direction as seen in the axial direction. On this occasion, the driving motor 2 and the ball screw 20 can be arranged close to each other so that a relationship of $L1<Dm/2+Db/2$ is satisfied, where Dm is an outer diameter of the driving motor 2, Db is an outer diameter of the double-row bearing 24, and L1 is an axis-to-axis distance between the driving motor 2 and the ball screw 20 in the radial direction.

Figure 8:
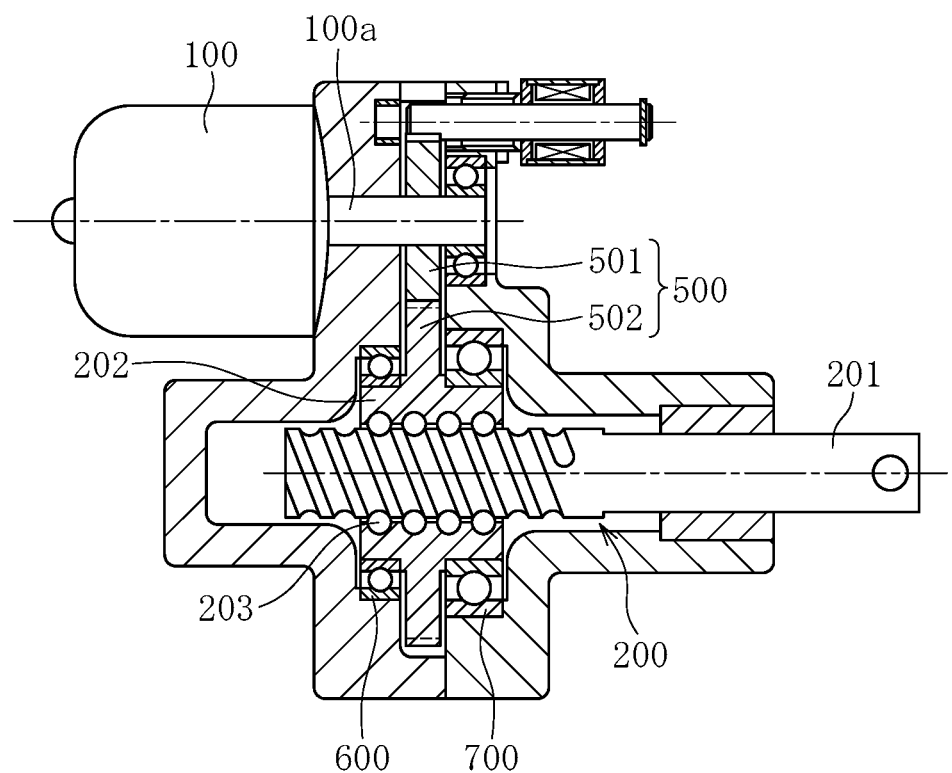
FIG. 8 is a vertical sectional view of a related-art electric linear actuator.

As described above, with the configuration of the electric actuator 1 in this embodiment, the axis-to-axis distance L1 between the driving motor 2 and the motion conversion mechanism 6 (ball screw 20) can be reduced compared with a related-art configuration illustrated in FIG. 8 by arranging the double-row bearing 24 configured to support the motion conversion mechanism 6 (ball screw 20) on the opposite side of the driving motor 2 with respect to the transmission gear mechanism 5 (the drive gear 16 and the driven gear 17), and downsizing of the electric actuator in the radial direction can thus be achieved.

Moreover, in the case of this embodiment, the planetary-gear speed reduction mechanism 11 is similarly arranged on the opposite side of the double-row bearing 24 with respect to the transmission gear mechanism 5 (drive gear 16 and the driven gear 17), and an axis-to-axis distance L2 between the planetary-gear speed reduction mechanism 11 and the ball screw 20 can be reduced. That is, there can be provided a configuration in which a relationship of $L2<Dr/2+Db/2$ is satisfied, where Dr is an outer diameter of the planetary-gear speed reduction mechanism 11 (an outer diameter of the ring gear 12 in this embodiment), Db is the outer diameter of the double-row bearing 24, and L2 is the axis-to-axis distance between the planetary-gear speed reduction mechanism 11 and the ball screw 20 as the above-mentioned distance. Moreover, in the case of the configuration comprising the speed reduction mechanism as the electric actuator 1 according to this embodiment, a small-sized motor can be employed, and hence further downsizing of the electric actuator can be achieved. In particular, the planetary-gear speed reduction mechanism 11 is preferred for the downsizing of the electric actuator.

Moreover, in this embodiment, a double-row angular contact ball bearing is used as the double-row bearing 24 to stably support the ball screw 20. As illustrated in FIG. 1, any of balls 40 in two rows interposed between an outer ring 38 and an inner ring 39 are in contact with raceway surfaces of the outer ring 38 and raceway surfaces of the inner ring 39 at contact angles, and the double-row angular contact ball bearing can thus support a radial load as well as axial loads in both directions, thereby being capable of stably and reliably supporting the ball screw 20 performing the linear motion. The contact angle is an angle formed between a plane (radial plane) perpendicular to a center axis of the bearing and a line of action (long dashed short dashed line passing through the center of each of the balls 40 illustrated in FIG. 1) of a resultant force of forces transmitted from the raceway surface to the ball 40. Further, in this embodiment, there is employed a so-called back-to-back configuration in which the lines of actions of the respective balls 44 are arranged so as to cross each other on the radially outer side, which is also advantageous with respect to a moment load. In such a manner, in this embodiment, the ball screw 20 can stably and reliably be supported in the cantilever state against the loads in the various directions through employment of the back-to-back double-row angular contact ball bearing as the double-row bearing 24. Therefore, a reduction in operation efficiency and increases in noise and vibration due to an occurrence of a run out in the shaft of the ball screw 20 can be prevented.

The double-row bearing 24 configured to support the motion conversion mechanism 6 is not limited to the double-row angular contact ball bearing, and a pair of single-row angular contact ball bearings may be combined for use. In addition to the angular contact ball bearing, other double-row bearing using, for example, a deep groove ball bearing can be applied.

Figure 6:
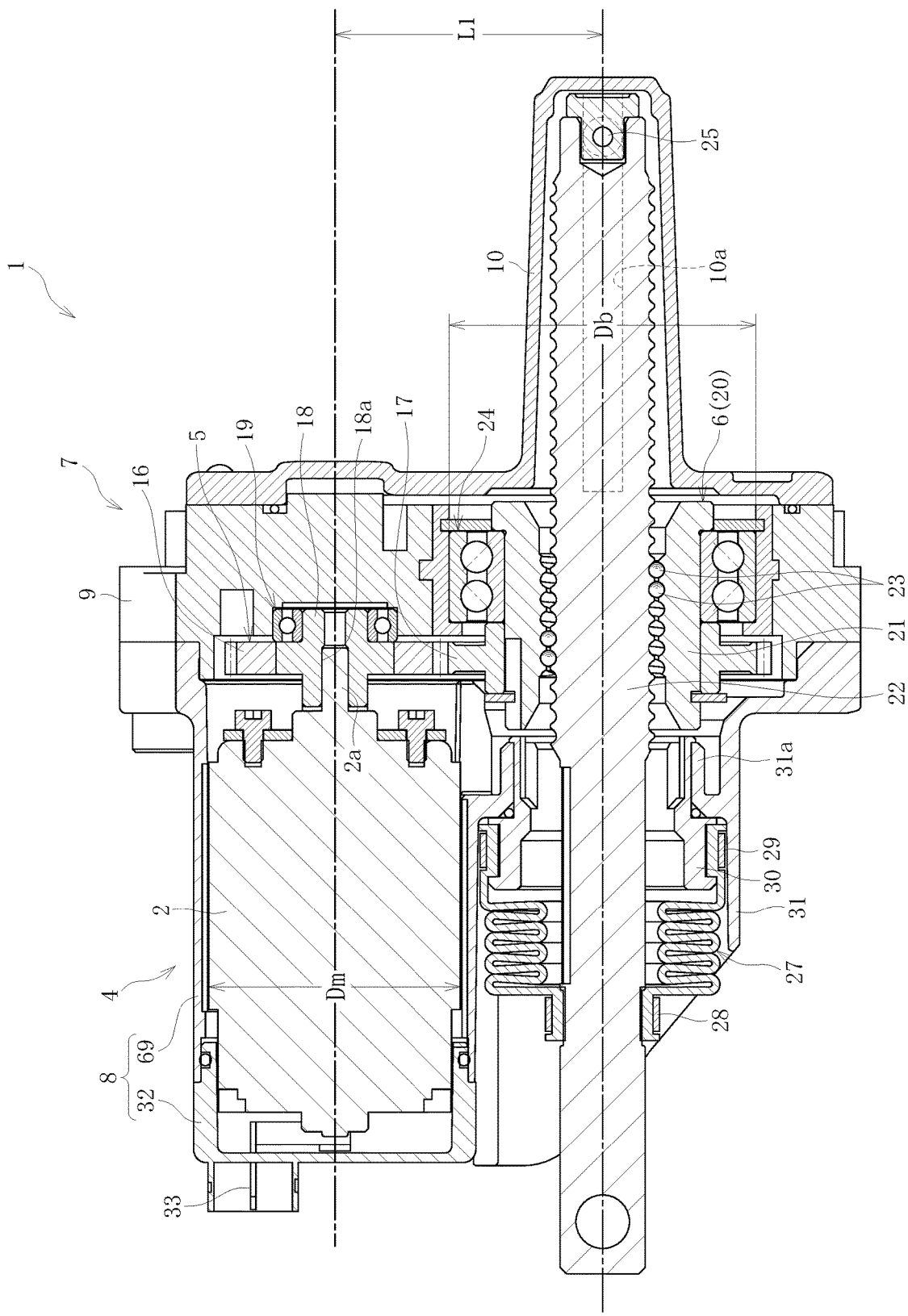
FIG. 6 is a vertical sectional view of the electric actuator according to another embodiment of the present invention.
Figure 7:
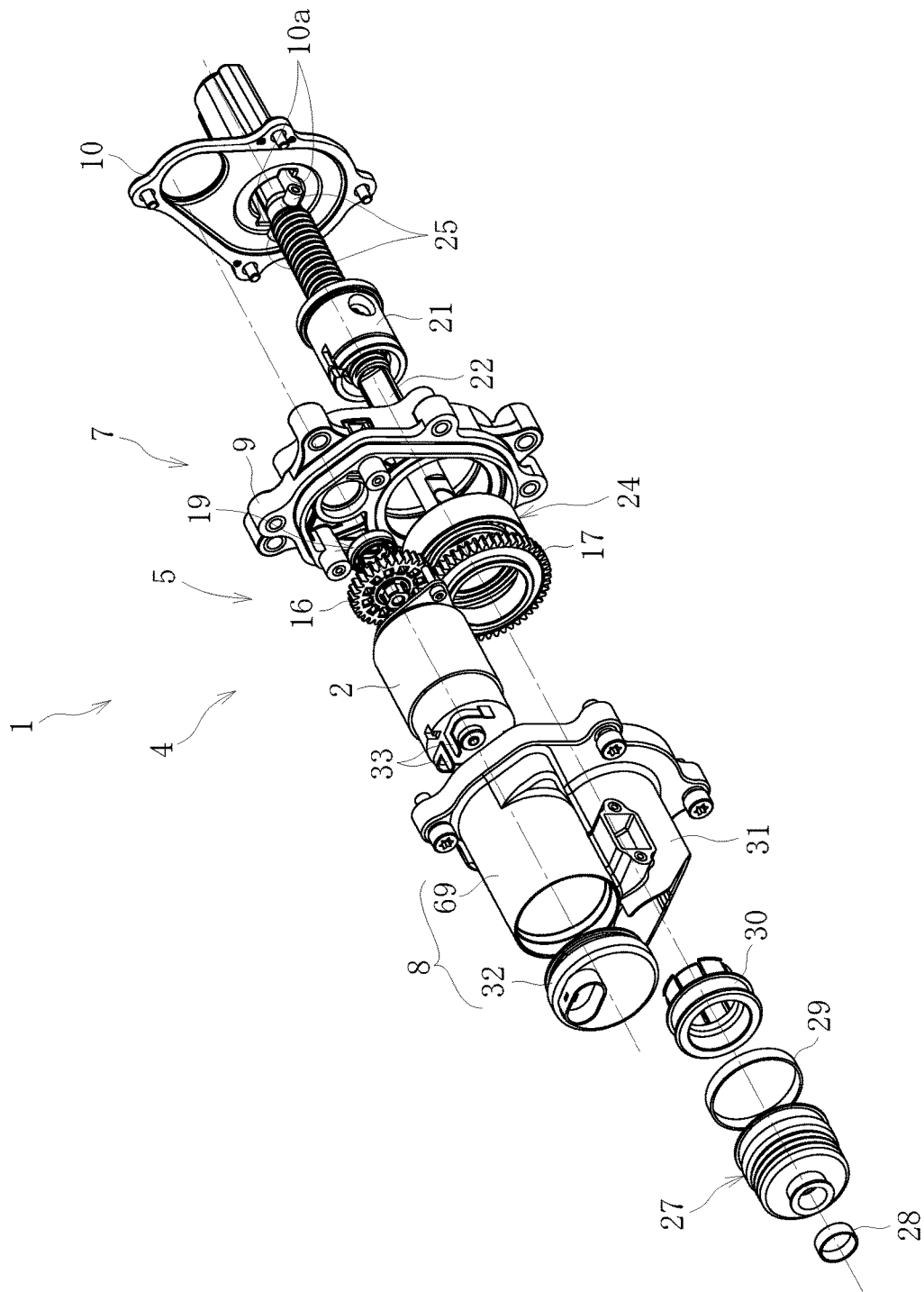
FIG. 7 is an exploded perspective view of the electric actuator according to the another embodiment.

FIG. 6 is a vertical sectional view of the electric actuator according to another embodiment of the present invention. FIG. 7 is an exploded perspective view of the electric actuator according to the another embodiment.

The electric actuator illustrated in FIG. 6 and FIG. 7 does not comprise the planetary-gear speed reduction mechanism 11 and the lock mechanism 26 provided for the electric actuator illustrated in FIG. 1 to FIG. 5. Therefore, the length of the motor case 8 (motor-case main body 69) is reduced a little in the axial direction, and the shaft case 10 has a shape without a portion configured to accommodate the lock mechanism 26. Moreover, in this case, the output shaft 2a of the driving motor 2 is coupled through press-fit to the shaft hole 18a of the gear boss 18, the driving force of the driving motor 2 is directly transmitted to the drive gear 16 (without intermediation of the planetary-gear speed reduction mechanism 11), and is transmitted from the drive gear 16 to the ball screw 20 through the driven gear 17.

In such a manner, the electric actuator adapted to other applications and specifications can be formed by only omitting the planetary-gear speed reduction mechanism 11 and the lock mechanism 26 and replacing the motor case 8 (motor-case main body 69) and the shaft case 10 with other cases, without changing many common parts. Thus, with the configuration of the electric actuator according to this embodiment, an electric actuator which is low in cost and excellent in versatility can be provided also for deployment as multiple types to an electric parking brake mechanism for vehicles including two-wheeled vehicles, an electric/hydraulic brake mechanism, an electric shift change mechanism, and an electric power steering as well as a 2WD/4WD electric switching mechanism and an electric shift change mechanism for an outboard engine (for a vessel propulsion engine), and the like.

The electric actuator according to the another embodiment is configured as in the embodiment illustrated in FIG. 1 to FIG. 5 in points other than those described above. Thus, the electric actuator according to the another embodiment is also so configured that the ball screw 20 is supported by the double-row bearing 24 in the cantilever state, and any bearing configured to support the ball screw 20 is not arranged on the driving motor 2 side as in the embodiment illustrated in FIG. 1 to FIG. 5. Therefore, also in the another embodiment, the driving motor 2 can be arranged close to the ball screw 20 in the radial direction, and there can be provided the configuration in which the relationship of L1<Dm/2+Db/2 is satisfied, where Dm is the outer diameter of the driving motor, Db is the outer diameter of the double-row bearing, and L1 is the axis-to-axis distance between the driving motor and the motion conversion mechanism.

Description is made of the embodiments of the present invention. However, the present invention is not limited to the above-mentioned embodiments. As a matter of course, the present invention may be carried out in various modes without departing from the spirit of the present invention.

REFERENCE SIGNS LIST 1 electric actuator
2 driving motor
2a output shaft
3 speed reduction mechanism
5 transmission gear mechanism
6 motion conversion mechanism
11 planetary-gear speed reduction mechanism
24 double-row bearing

The invention claimed is:

1. An electric actuator, comprising:
   a driving motor;
   a motion conversion mechanism configured to convert a rotary motion of the driving motor to a linear motion in an axial direction parallel with an output shaft of the driving motor;
   a transmission gear mechanism configured to transmit a driving force from the driving motor to the motion conversion mechanism; and
   a speed reduction mechanism configured to reduce a speed of the rotary motion of the driving motor and output the rotary motion reduced in speed to the transmission gear mechanism,
   wherein a double-row bearing configured to support the motion conversion mechanism is arranged at a side of the transmission gear mechanism opposite to a side of the transmission gear mechanism at which the driving motor is located,
   wherein a relationship of 0<L1<Dm/2+Db/2 is satisfied, where Dm is an outer diameter of the driving motor, Db is an outer diameter of the double-row bearing, and L1 is an axis-to-axis distance between the driving motor and the motion conversion mechanism, and
   wherein a relationship of 0<L2<Dr/2+Db/2 is satisfied, where Dr is an outer diameter of the speed reduction mechanism, and L2 is an axis-to-axis distance between the speed reduction mechanism and the motion conversion mechanism.

2. The electric actuator according to claim 1, wherein the speed reduction mechanism comprises a planetary-gear speed reduction mechanism.

3. The electric actuator according to claim 1, wherein the double-row bearing comprises a double-row angular contact ball bearing.

* * * * *